(12) United States Patent
Alexander et al.

(10) Patent No.: US 9,715,442 B2
(45) Date of Patent: Jul. 25, 2017

(54) METHOD AND APPARATUS FOR IN-VEHICLE HARDWARE AND SOFTWARE TESTING

(71) Applicant: Ford Global Technologies, LLC, Dearborn, MI (US)

(72) Inventors: Stephen Alexander, Livonia, MI (US); Peter Treman, Commerce Township, MI (US); Jason Robert Brown, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 14/669,951

(22) Filed: Mar. 26, 2015

(65) Prior Publication Data
US 2016/0283361 A1  Sep. 29, 2016

(51) Int. Cl.
*G06F 11/00* (2006.01)
*G06F 11/36* (2006.01)
*G06F 11/273* (2006.01)

(52) U.S. Cl.
CPC ...... *G06F 11/3688* (2013.01); *G06F 11/3648* (2013.01); *G06F 11/3664* (2013.01); *G06F 11/273* (2013.01)

(58) Field of Classification Search
CPC ............. G06F 11/3688; G06F 11/3664; G06F 11/273; G06F 11/2733; G06F 11/3648; G06F 11/3696; G06F 11/261; G07C 5/0808; G01M 17/00; G01M 15/02; G01R 31/006; G01R 31/007
See application file for complete search history.

(56) References Cited

U.S. PATENT DOCUMENTS

| 6,766,233 | B2 | 7/2004 | Odinak et al. | |
|---|---|---|---|---|
| 2008/0033609 | A1* | 2/2008 | Razavi | G01M 17/00 701/31.4 |
| 2010/0042288 | A1* | 2/2010 | Lipscomb | G07C 5/0808 701/31.4 |
| 2010/0204878 | A1* | 8/2010 | Drew | B60R 16/0232 701/31.4 |
| 2010/0299020 | A1* | 11/2010 | Koepf | G06F 11/25 701/1 |

(Continued)

OTHER PUBLICATIONS

Schmid, et al., ATZelektronik, Feb. 2008, "Using Hardware-in-the-Loop Technology for Testing Telematics Components." (4 pages).

(Continued)

*Primary Examiner* — Marc Duncan
(74) *Attorney, Agent, or Firm* — Jennifer M. Stec; Brooks Kushman P.C.

(57) ABSTRACT

An apparatus may receive bus data from a vehicle, may receive removable media storing an application and settings, and may interface with an external test hardware device. The apparatus may include a processor programmed to set up the test hardware device in accordance with the settings, and execute the application using the bus data and the external test hardware devices as configured. The apparatus may also update an indicator associated with a device category of a connected test hardware device to indicate presence of the test hardware device.

18 Claims, 4 Drawing Sheets

(56) References Cited

U.S. PATENT DOCUMENTS

| | | | |
|---|---|---|---|
| 2012/0029762 A1* | 2/2012 | Ubik | G07C 5/008 |
| | | | 701/29.6 |
| 2012/0046826 A1* | 2/2012 | Panko | G07C 5/0808 |
| | | | 701/33.3 |
| 2013/0167119 A1* | 6/2013 | Lee | G06F 8/36 |
| | | | 717/121 |
| 2013/0246135 A1* | 9/2013 | Wang | G07C 5/008 |
| | | | 705/14.4 |
| 2013/0311032 A1* | 11/2013 | Shelcusky | G07C 5/008 |
| | | | 701/29.1 |
| 2014/0005880 A1 | 1/2014 | Guenkova-Luy et al. | |
| 2014/0213238 A1 | 7/2014 | Giraud et al. | |
| 2014/0277922 A1* | 9/2014 | Chinnadurai | G07C 5/0808 |
| | | | 701/33.2 |
| 2014/0278199 A1* | 9/2014 | Rajagopal | G06F 11/3668 |
| | | | 702/122 |

OTHER PUBLICATIONS

DGE, Inc., 2013, "HMIts Human Machine Interface Test System," http://www.dgeinc.com. (1 page).

DGE Inc.—Telematics and Infotainment, printed on Sep. 17, 2014, Telematics Update, "Human Machine Interface Test System," http://www.dgeinc.com/telematics.htm. (3 pages).

Intertek, printed on Sep. 17, 2014, "Automotive Telematics & Infotainment Testing," http://www.interek.com/automotive/telematics-infotainment. (3 pages).

Izumi, et al. NTT DOCOMO Technical Journal vol. 10, No. 2, Technology Reports, "FOMA In-vehicle Telematics Module and Addition of Network Functionality."accessable at http://www.nittdocomo.co.jp/english/telematics_module, last accessed on Mar. 26, 2015. (7 pages).

\* cited by examiner

METHOD AND APPARATUS FOR IN-VEHICLE HARDWARE AND SOFTWARE TESTING

TECHNICAL FIELD

Aspects of the disclosure generally relate to apparatus and method for testing in-vehicle hardware and software.

BACKGROUND

Versions software and hardware components may undergo validation testing before being released to manufacturing. These tests may include a series of technical use case scenarios designed to ensure that the tested components meets design requirements and respond correctly to predefined inputs. In some cases, it may be difficult to test software in a production environment. For instance, to operate in a production environment, software code may have to be signed, and then installed to a microcontroller. When embedded software fails, it may be difficult to understand the context of the failure.

SUMMARY

In a first illustrative embodiment, an apparatus includes a vehicle data bus port configured to receive bus data from a vehicle; a removable media port configured to receive removable media storing an application and settings; an input/output port configured to interface with an external test hardware device; and a processor programmed to set up the test hardware device in accordance with the settings, and execute the application using the bus data and the external test hardware devices as configured. The apparatus may include multiple input/output ports configured to interface with multiple external test hardware devices concurrently, and the processor may be programmed to configure multiple scenarios of the test hardware devices in accordance with the settings.

In a second illustrative embodiment, a computer-implemented method includes receiving, by processor of a tester apparatus, settings and an application from a media storage device; setting up one or more test hardware devices connected to input/output ports of the tester apparatus according to the settings; and executing the application by the processor using the test hardware devices as set up and, based on the settings, one of: (i) live vehicle bus data and (ii) prerecorded vehicle bus data. The method may further include executing the application using at least one of (iii) live data from peripheral devices and (iv) prerecorded data from peripheral devices.

In a third illustrative embodiment, a system includes a processor programmed to update an indicator associated with a device category of a connected test hardware device to indicate presence of the test hardware device; receive an application from a removable media storage device; receive vehicle bus data from a vehicle; and execute the application using the test hardware device and the vehicle bus data.

DETAILED DESCRIPTION

Figure 1A:
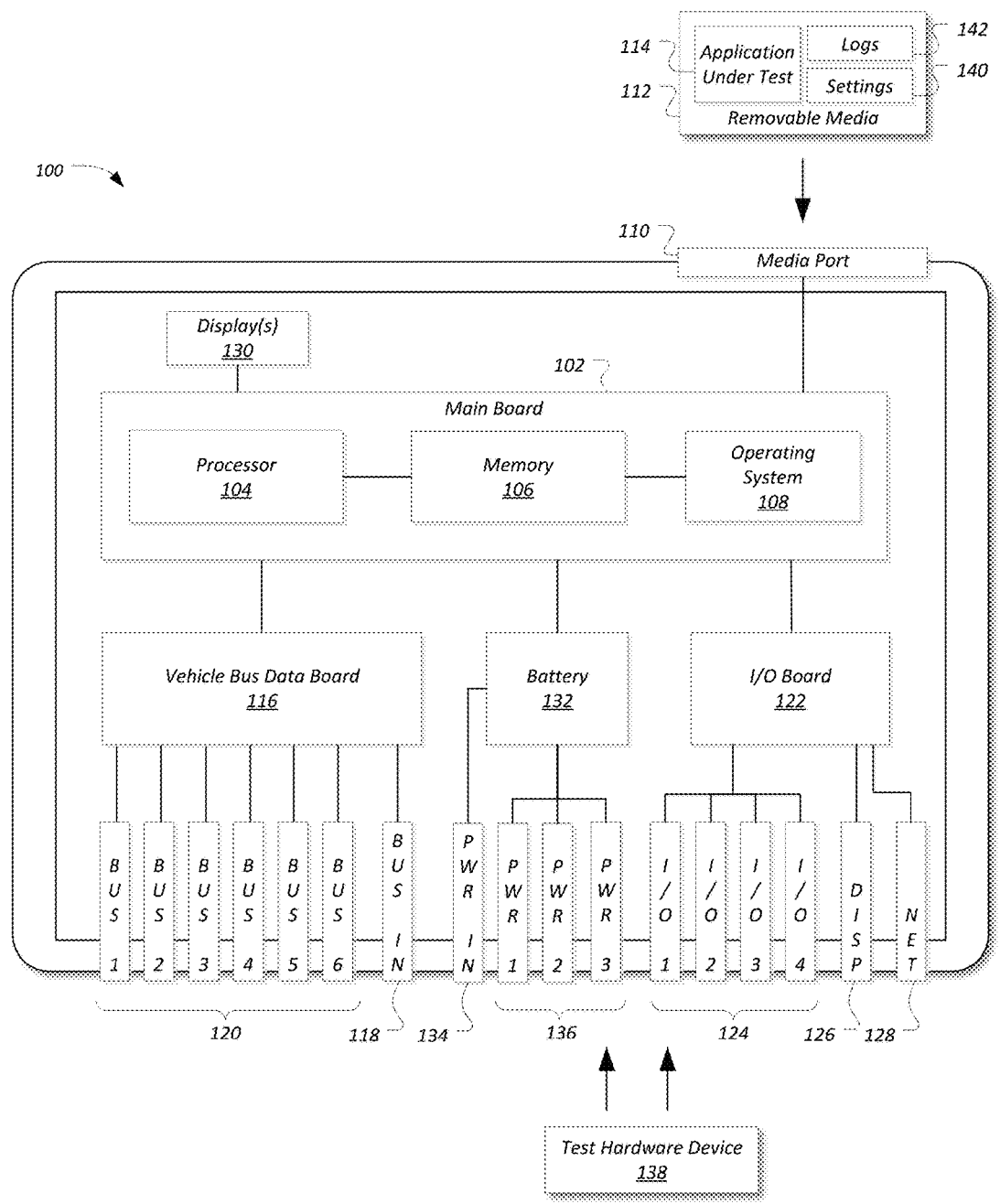
FIG. 1A illustrates a block diagram of an example tester apparatus.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A tester apparatus may include a hardware and software environment configured to provide a controlled testing environment in which a software module or application may be executed. To facilitate quick configuration of the application under test, the tester apparatus may include a media reader onto which removable media storing the software code to test may be provided. The tester apparatus may be configured to, for the application under test, control component variability of the testing environment. The tester apparatus may be further configured to support connection to a vehicle in which the test is being performed, such as via a controller area network (CAN) bus or other vehicle bus, to allow the tester apparatus to receive actual vehicle information during the test.

The tester apparatus may include one or more input/output ports (e.g., universal serial bus (USB) ports, etc.) to which hardware devices used for the testing may be connected or disconnected. These peripheral test hardware devices may include, for example, global positioning system (GPS) devices, near-field communications (NFC) reader devices, modems, dedicated short-range communications devices, radio-frequency identifier (RFID) reader devices, and Bluetooth communications devices, as some non-limiting examples. When connected, the test hardware devices may be available for use by the software under test. In an example, the tester apparatus may include a user interface display configured to indicate what test hardware devices are connected to the tester apparatus and initialized for use.

The test hardware devices available for use by the software module/application under test may be configured according to test configuration settings. These settings may be provided to the tester apparatus on the removable media along with the application under test, and may also be adjustable by a user on the fly to allow for the adjustment or fine-tuning specific aspects of the testing environment. In an example, the tester apparatus may be further configured to include one of more physical or virtual touch controls that may be adjusted by a user on the fly to allow for the adjustment or fine-tuning specific aspects of the testing environment.

In an example, in a testing scenario with a GPS module active, the tester apparatus may be configured to allow for the adjustment in variance of the GPS, e.g., that the GPS location may not be as accurate as it theoretically could be. In another example, in a testing scenario with wireless network connectivity, the tester apparatus may be configured to simulate packet loss conditions (e.g., 20% packet loss) of the wireless signal to test scenarios with marginal signal quality. In yet a further example, in a testing scenario the tester apparatus may be configured to utilize an intermittent connection simulation to test intermittent error conditions.

The tester apparatus may be further configured to provide for repeatability of test scenarios to allow for the debugging or fine-tuning of the application under test. In an example, the tester apparatus may allow the user to record the vehicle bus data (e.g., to the media) for later playback to repeat the test scenario using the recorded bus data.

Thus, the testing apparatus may be configured to use real vehicle data (either live or prerecorded), and real vehicle hardware to test software modules. Moreover, the testing environment may be altered without requiring changes to the software module to be tested. Accordingly, the testing apparatus may be utilized to provide for rapid development and debugging of telematics or other embedded software code, before the embedded code is released to manufacturing. Further aspects of the tester apparatus are discussed in detail below.

FIG. 1A illustrates a block diagram of an example tester apparatus 100. The apparatus 100 may include a main board 102 having at least one processor 104, a memory 106, and an operating system 108 installed thereon. The main board 102 may be connected to a media port 110 into which removable media 112 may be inserted. The removable media 112 may include an application under test 114, settings 140 to use to execute the application under test 114, and logs 142 generated based on the execution of the application under test 114. The main board 102 may also be connected to one or more displays 130 configured to visually or otherwise information to a user, and a battery 132 configured to power the apparatus 100. The main board 102 may also be connected to a bus data board 116 configured to communicate vehicle bus data (such as controller area network (CAN) data) between the apparatus 100 and a vehicle connected to the apparatus 100 to allow the application under test 114 to execute using live vehicle data. The main board 102 may also be connected to an input/output (I/O) board configured to provide for the connection of hardware components may be available for use by the application under test 114. The apparatus 100 may take many different forms and include multiple and/or alternate components and facilities. While an exemplary apparatus 100 is shown in FIG. 1A, the exemplary components as illustrated are not intended to be limiting. Indeed, additional or alternative components and/or implementations may be used.

The apparatus 100 may include one or more processor 104 configured to perform instructions, commands and other routines in support of the processes described herein. For instance, the processor 104 may be configured to execute instructions of a vehicle telematics operating system 108 to provide features such as navigation, accident reporting, satellite radio decoding, and hands-free calling. Such instructions of the operating system 108 and other data may be maintained in a non-volatile manner using a variety of types of computer-readable storage medium. A computer-readable medium (also referred to as a processor-readable medium or storage) includes any non-transitory medium (e.g., a tangible medium) that participates in providing instructions or other data that may be read by the processor 104 of the apparatus 100. Computer-executable instructions may be compiled or interpreted from computer programs created using a variety of programming languages and/or technologies, including, without limitation, and either alone or in combination, Java, C, C++, C#, Objective C, Fortran, Pascal, Java, Java Script, Python, Perl, and PL/SQL.

The processor 104 may be further configured to execute instructions of the application under test 114 loaded to the memory 106 from removable media 112 inserted to the media port 110. In an example, the media port 110 may be a secure digital (SD) card port and the removable media 112 may be an SD card, but other types of removable media may be utilized as well, such as hard drives or other magnetic media, or compact discs or other optical media. As with the operating system 108, the application under test 114 may include instructions that may executable by the processor 104.

The bus data board 116 may be configured to receive vehicle bus data from a vehicle connected to the data input 118 via an ODB-II port or other data bus access port of the vehicle. The bus data board 116 may be further configured to decode the received vehicle bus data, and provide the data to the main board 102 for use by the processor 104 executing the operating system 108 and application under test 114. The bus data board 116 may be further configured to act as a data hub for bus data, and may include one or more bus data ports 120 to which devices external to the apparatus 100 may interact with vehicle bus data from the vehicle via the apparatus 100.

The I/O board 122 may be connected to the main board 102 and may be configured to provide input and output functionality to the apparatus 100. In an example, the I/O board 122 may include one or more I/O ports 124 to which external devices to be utilized by the application under test 114 may be connected. As some possibilities, the I/O ports 124 may include one or more universal serial bus (USB) ports 124 or other data ports (e.g., a Firewire port, a Thunderbolt port, etc.). As some other possibilities, the I/O board 122 may include an external display port 126 (e.g., a high-definition multimedia interface (HDMI) port, a DisplayPort port, a digital visual interface (DVI) port, an audio out for audio interfaces, etc., to facilitate connection of an external display to the apparatus 100. In yet a further example, the I/O board 122 may include a network port 128 (e.g., an Ethernet jack or other network connection) to facilitate connection of the apparatus 100 to a communications network such as a local in-vehicle network or the Internet. In another example, the ports 124 may be used to transfer data to and from cloud via connected network adapter.

The display 130 may include one or more devices configured to provide information to a user of the apparatus 100. In some examples, the display 130 may be a touchscreen configured to receive input as well as display information, while in other cases the display 130 may simply provide information. In some cases, the display 130 may include one or more lights or indicators with dedicated functions, while in other cases the display 130 may include a general-purpose display device, such as a liquid crystal display (LCD) panel, a light-emitting diode (LED) display, or an organic LED (OLED) display.

The battery 132 may include one or more cells, capacitors, or other devices configured to store electrical energy for use in powering the apparatus 100. The battery 132 may be connected to the main board 102 to provide power to the processor 104 and display(s) 130. The battery 132 may also be connected to a power input 134 of the apparatus 100 to allow the battery 132 to receive power from an external source for charging the battery 132 and/or for operating the apparatus 100. The external source may be, as some possibilities, a vehicle accessory power port (e.g., 6, 12 or 24 volts direct current), a power adapter configured to plug into a home wall outlet (e.g., 120 volts or 240 volts alternating current, etc.), or external renewable energy source. The apparatus 100 may further include one or more power outputs 136 that may be configured to provide power from the battery 132 (or from the external power source connected via the power input 134) to one or more external devices (e.g., test hardware devices 138).

The test hardware device(s) 138 may include one or more hardware components configured to provide functionality to the apparatus 100 under the control of the operating system 108 and application under test 114. As some examples, the test hardware device 138 may include a global positioning system (GPS) device, a near-field communication reader device, a USB modem device, a dedicated short-range communications (DSRC) device, a radio-frequency identifier (RFID) reader device, and a BLUETOOTH module. Using the facilities of the I/O board 122, the apparatus 100 may be configured to interact with one or more test hardware devices 138. In an example, the test hardware device 138 may be connected to one of the I/O ports 124 to facilitate communication with the apparatus 100. The operating system 108 may be further configured to include device drivers configured to allow the apparatus 100 to interoperate with the connected test hardware devices 138, and may expose functionality of the connected test hardware devices 138 to the application under test 114 (e.g., through one or more software application programming interfaces (APIs) to which the application under test 114 may be programmed to access). In some cases, the test hardware devices 138 may also be connected to a power output 136 of the apparatus to allow the apparatus 100 to power the test hardware devices 138, which may be useful for execution of the application under test 114.

The removable media 112 may further include settings 140 descriptive of the test environment in which the application under test 114 may be specified to run. The settings 140 may include information, such as configurations of options of the test hardware device 138 or devices 138 utilized by the application under test 114. As some possibilities, these configuration options may include GPS accuracy, a percentage or other amount of simulated packet loss, network connection signal strength, whether to perform simulated intermittent connection of a test hardware device 138, whether to disable one or more functions of a connected test hardware device 138. In some cases, the settings 140 may be configured using the apparatus 100 (e.g., by way of a human-machine interface (HMI) exposed via the displays 130), while in other cases the settings 140 may be configured by another device and provided onto the removable media 112 to be read and applied by the apparatus 100.

The removable media 112 may also include logs 142 including data collected during execution of the application under test 114 by the apparatus 100. As some possibilities, the logs 142 may include result data written by the application under test 114 or condition data surrounding the events that occurred during execution of the application under test 114 (e.g., recorded bus data received from the data input 118, recorded status information such as network strength information received from the connected test hardware devices 138, etc.). In another possibility, the logs 142 may be utilized as input data to the application under test 114 rather than live data (e.g., use of previously recorded vehicle bus data rather than live bus data).

Figure 1B:
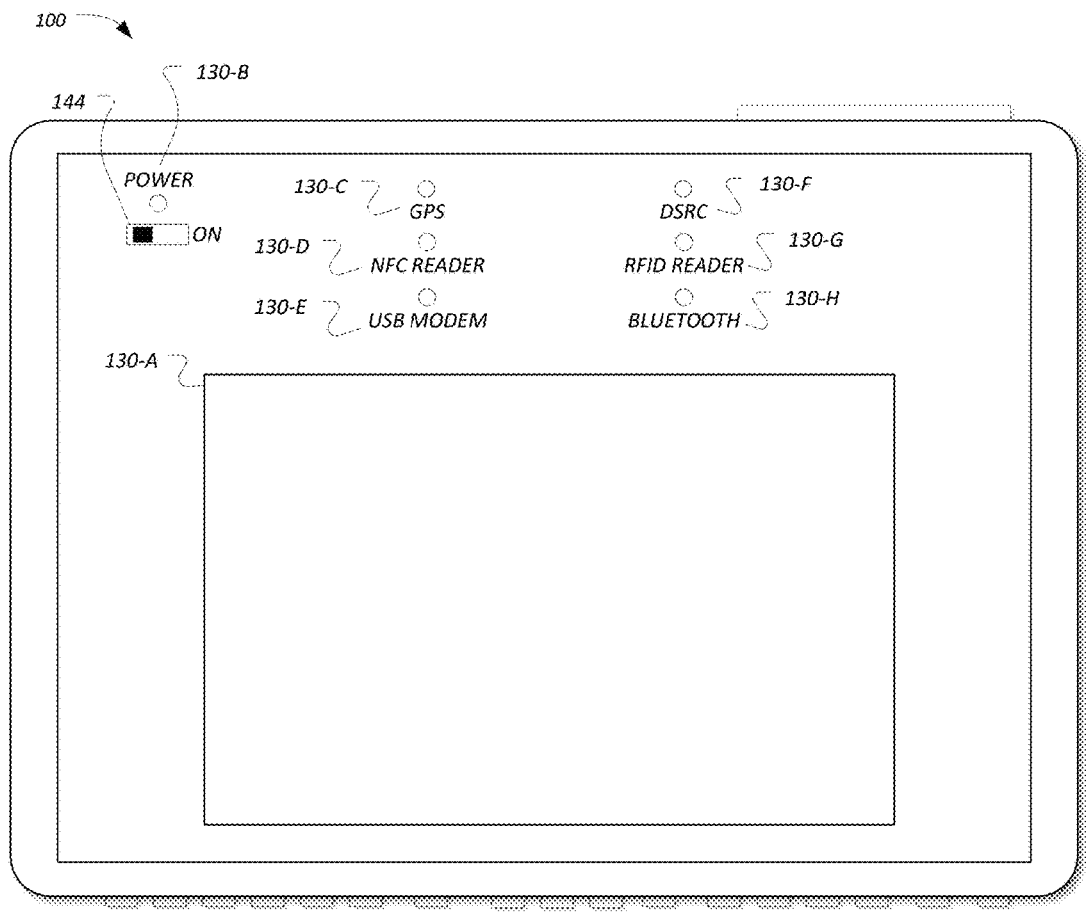
FIG. 1B illustrates an example diagram of the displays of the example tester apparatus.

FIG. 1B illustrates an example diagram of the displays 130 of the example tester apparatus 100. As shown, the apparatus 100 includes a panel display 130-A, a power indicator display 130-B, a GPS indicator display 130-C, an NFC indicator display 130-D, a USB modem indicator display 130-E, a DSRC indicator display 130-F, a RFID indicator display 130-G, and a BLUETOOTH indicator display 130-H. The apparatus 100 may also include other elements, such as a power switch 144. As mentioned above, the apparatus 100 may take many different forms and include multiple and/or alternate components and facilities. While an exemplary apparatus 100 is shown in FIG. 1B, the exemplary components as illustrated are not intended to be limiting. Indeed, additional or alternative components and/or implementations may be used.

The panel display 130-A may be configured to provide a graphical user interface to a user of the apparatus 100. In an example, the panel display 130-A may be driven by the processor 104 executing the operating system 108 to provide information regarding the operation of the apparatus 100. The displayed information may include, in an example, a settings interface for configuration of the settings 140 of the test hardware devices 138. In some cases, the settings interface may be used to adjust the settings 140 during execution of the application under test 114. In other cases, the settings interface may be used to update the settings 140 as stored to the removable media 112.

The power indicator display 130-B may be configured to indicate whether the apparatus 100 is turned on. In an example, when the power switch 144 is turned to the ON position, the apparatus 100 is turned on, and when the power switch 144 is not turned to the ON position the apparatus 100 is turned off. In addition to illuminating the power indicator display 130-B, when the apparatus 100 is turned on, the apparatus 100 may be configured to load and execute the application under test 114 loaded from the removable media 112. In other examples, the user may be able to select from the panel display 130-A an option to begin execution of the application under test 114. The user interface of the panel display 130-A may additionally show other options, such as options for turning on and off creation of logs 142 of execution of the application under test 114, or for using prerecorded logs 142 or live bus data to playback the application under test 114.

In addition to the settings interface for configuration of the settings 140 of the test hardware devices 138, the apparatus 100 may include a set of indicators configured to indicate the connection and operational status of the connected test hardware devices 138. For example, the USB modem indicator display 130-C may be illuminated when a USB modem test hardware device 138 is connected to the apparatus 100, the NFC reader indicator display 130-D may be illuminated when an NFC reader test hardware device 138 is connected to the apparatus 100, the USB modem indicator display 130-E may be illuminated when a USB modem test hardware device 138 is connected to the apparatus 100, the DSRC indicator display 130-F may be illuminated when a DSRC test hardware device 138 is connected to the apparatus 100, the RFID indicator display 130-G may be illuminated when a RFID test hardware device 138 is connected to the apparatus 100, and the BLUETOOTH indicator display 130-H may be illuminated when a BLUETOOTH test hardware device 138 is connected to the apparatus 100.

Figure 2:
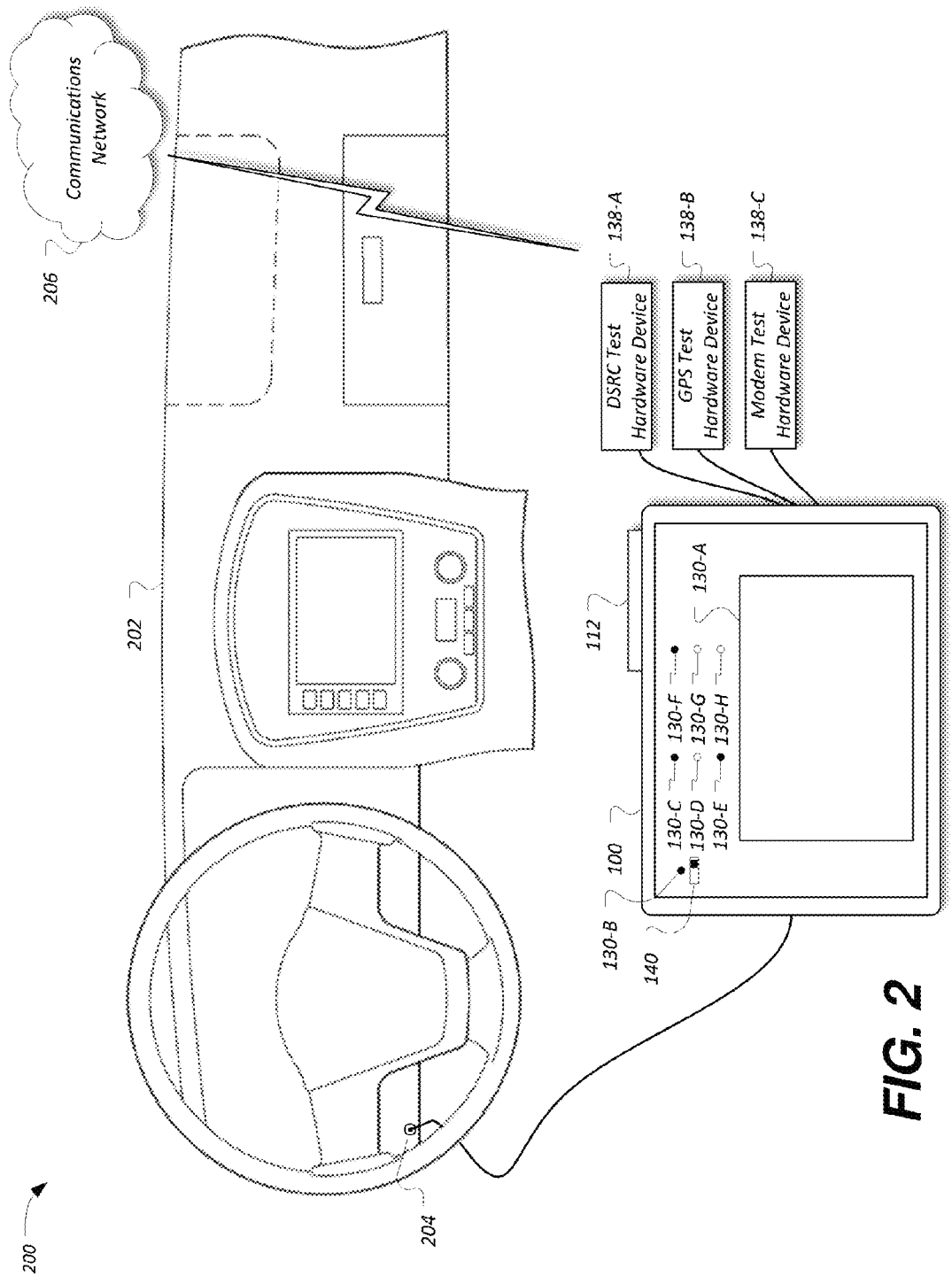
FIG. 2 illustrates an example diagram of the tester apparatus connected to a vehicle network and to test hardware devices as peripherals.

FIG. 2 illustrates an example diagram 200 of the tester apparatus 100 connected to a data port 204 of a vehicle 202 and to test hardware devices 138. The vehicle 202 may include various types of passenger vehicle, such as crossover utility vehicle (CUV), sport utility vehicle (SUV), truck, recreational vehicle (RV), boat, plane or other mobile machine for transporting people or goods.

The vehicle 202 may include one or more internal devices or controllers configured to communicate with one other via one or more in-vehicle networks. The in-vehicle networks may include one or more of a vehicle controller area network (CAN), an Ethernet network, and a media oriented system transfer (MOST), as some examples. As some examples, the controllers may include a vehicle modem (which may not be present in some configurations), a global positioning system (GPS) device configured to provide current vehicle 202 location and heading information, a powertrain control module configured to provide control of engine operating components (e.g., idle control components, fuel delivery components, emissions control components, etc.) and monitoring of engine operating components (e.g., status of engine diagnostic codes and fluid levels, etc.); a body control module configured to manage various power control functions such as exterior lighting, interior lighting, keyless entry, remote start, and point of access status verification (e.g., closure status of the hood, windows, doors and/or trunk of the vehicle 202); a radio transceiver module configured to communicate with key fobs or other local vehicle 202 devices; and a climate control management module configured to provide control and monitoring of heating and cooling system components (e.g., compressor clutch and blower fan control, temperature sensor information, etc.).

The data port 204 may include one or more interfaces from which vehicle bus data provided over the in-vehicle networks may be supplied to connected devices. In an example, the data port 204 may be an ODB-II diagnostic port. The data input 118 of the apparatus 100 may be connected to the data port 204 to receive the bus data. The bus data provided to the apparatus 100 may include various data from the controllers of the vehicle 202. As some non-limiting examples, the bus data may include accelerator pedal position, steering wheel angle, vehicle speed, vehicle location, and vehicle HMI information, such as steering wheel button press information.

In addition to connection to the data port 204, as shown the apparatus 100 may be further connected to one or more test hardware devices 138. In the illustrated example, the apparatus 100 is connected to a DSRC test hardware device 138-A, a GPS test hardware device 138-B, and a modem test hardware device 138-C. Each of these test hardware devices 138-A through 138-C may be connected to a different one of the I/O ports 124 to communicate data with the apparatus 100. Optionally, one or more of the test hardware devices 138-A through 138-C may also be connected to the power outputs 136 to allow for the devices 138 to be powered by the apparatus 100. It should be noted that the illustrated configuration is only an example, and more, fewer, or different test hardware devices 138 may be connected to the apparatus 100.

In many cases, the test hardware devices 138 may be configured to communicate with remote devices over the communications network 206. The communications network 206 may provide communications services, such as packet-switched network services (e.g., Internet access, VoIP communication services), to devices connected to the communications network 206. An example of a communications network 206 may include a cellular telephone network.

Also as shown in the diagram 200, the displays 130 of the apparatus 100 may indicate the status of the apparatus 100 and connected test hardware devices 138. For instance, the power indicator display 130-B may be illuminated to indicate that the apparatus 100 is on, the GPS indicator display 130-C may be illuminated to indicate presence of the GPS test hardware device 138-B, the USB modem indicator display 130-E may be illuminated to indicate presence of the a modem test hardware device 138-C, and the DSRC indicator display 130-F may be illuminated to indicate presence of the DSRC test hardware device 138-A.

Figure 3:
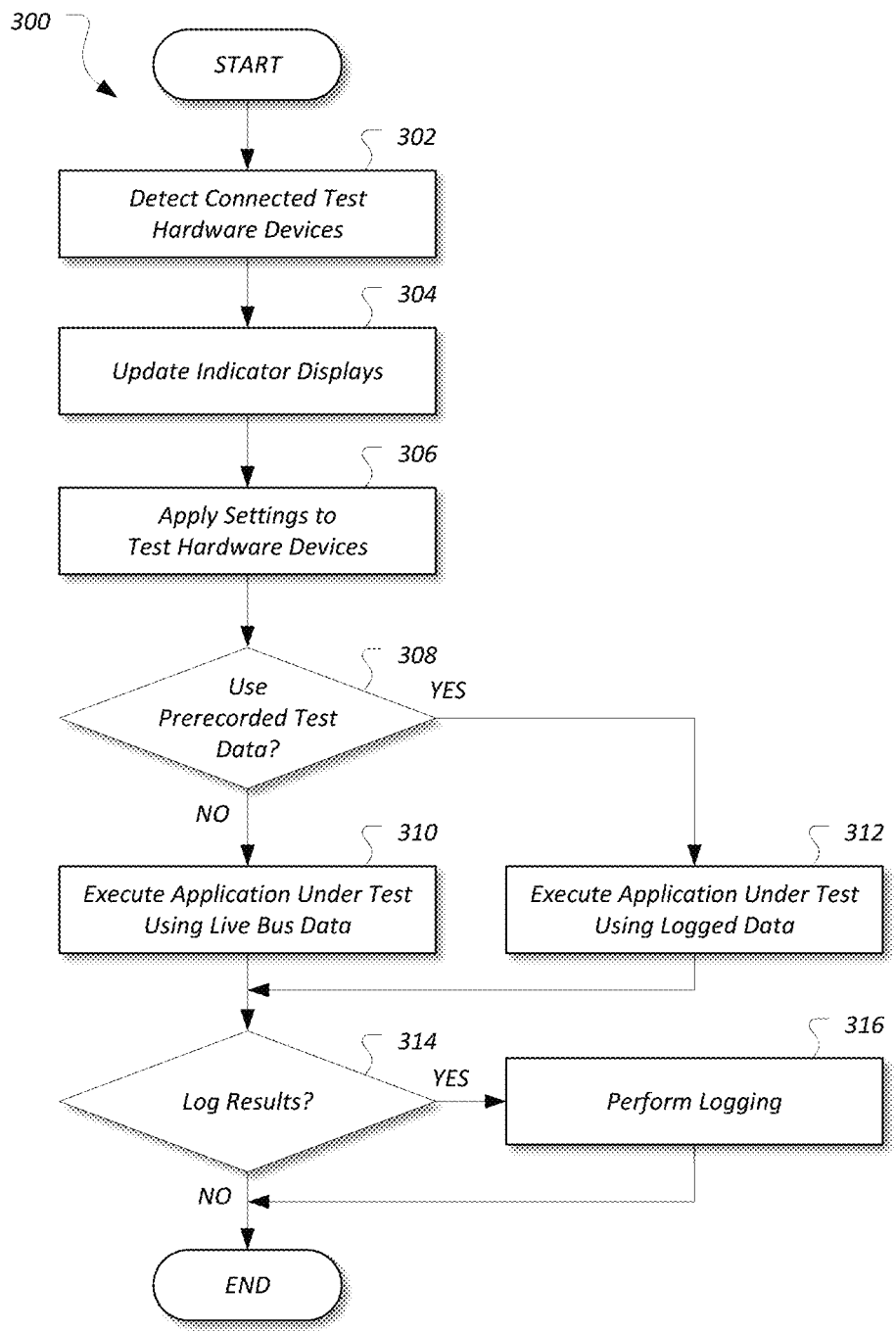
FIG. 3 illustrates an example process for executing an application under test using the apparatus.

FIG. 3 illustrates an example process 300 for executing an application under test 114 using the apparatus 100. The process 300 may be performed, in an example, to test module code of the application under test 114 in real-life conditions, without having to sign and install the code to a telematics controller in the vehicle 202.

At operation 302, the apparatus 100 detects connected test hardware devices 138. In an example, the operating system 108 may be configured to include functionality to identify devices plugged into the input/output ports 124 of the apparatus 100. When a device is identified, the operating system 108 may be further configured to load drivers associated with the identified device, and initialize the test hardware devices 138 for use.

At operation 304, the apparatus 100 updates the indicator displays 130 of the apparatus 100. In an example, the connected test hardware devices 138 may be associated with categories of test hardware devices 138 (e.g., GPS, NFC, Modem, DSRC, RFID, BLUETOOTH, etc.), and the apparatus may include indicator displays 130 also associated with the categories of test hardware devices 138. When a test hardware device 138 is connected and recognized, in an example, the operating system 108 may be configured to illuminate the indicator display 130 corresponding to the connected test hardware device 138. For instance, if a GPS test hardware device 138 is connected, the operating system 108 may direct the GPS indicator display 130-C to illuminate. In some cases, the functionality to adjust the state of the indicator displays 130 may be controlled by driver shims loaded by the operating system 108 when the drivers for the connected test hardware devices 138 are loaded.

At operation 306, the apparatus 100 applies settings 140 to the connected test hardware devices 138. In an example, the apparatus 100 may load the settings 140 from the removable media 112, and may update the configuration of the connected test hardware devices 138 in accordance with the loaded settings 140. As some possibilities, the settings 140 may specify GPS accuracy, a percentage or other amount of simulated packet loss, network connection signal strength, whether to perform simulated intermittent connection of a test hardware device 138, or whether to disable one or more functions of a connected test hardware device 138. In some cases, the indicator displays 130 may be illuminated when the devices are connected and also enabled according to the settings 140.

At operation 308, the apparatus 100 determines whether to use logs 142 including prerecorded test data. In an example, the settings 140 may specify for the use of live vehicle data, received via the data port 204 of the vehicle 202 connected to the data input 118 of the apparatus 100. In another example, the settings 140 may specify for the test to utilize prerecorded data from logs 142 stored to the removable media 112. In a further example, the default setting 140 may be to utilize live data from the vehicle 202, if connected, and to use logged data if the vehicle 202 is not connected and prerecorded data is available on the removable media 112. If the settings 140 specify to use live vehicle data, control passes to operation 310. Otherwise, control passes to operation 312.

At operation 310, the apparatus 100 executes the application under test 114 using live bus data from the vehicle 202. The application under test 114 may accordingly execute using live vehicle data and the services of the connected test hardware devices 138. Live testing may be useful, for example, to identify how the application under test 114 may operate under current vehicles 202 conditions.

At operation 312, the apparatus 100 executes the application under test 114 using prerecorded data from the logs 142. The application under test 114 may accordingly execute using prerecorded data and the services of the connected test hardware devices 138. Prerecorded data testing may be useful, for example, for debugging purposes to identify how changes to the application under test 114 correct issues noted using the recorded test data.

At operation 314, the apparatus 100 determines whether to log results of execution of the application under test 114. In an example, the settings 140 may indicate what data, if any, should be logged during execution of the application under test 114. As some possibilities, the settings 140 may indicate whether or not to log vehicle bus data, network signal strength data, GPS coordinate data, and/or trace information from the application under test 114 itself. If the settings 140 indicate for information to be logged, control passes to operation 316. At operation 316, the apparatus 100 logs the indicated information. In many cases, the information may be logged to the removable media 112. After execution of the application under test 114 concludes (e.g., at the end of the program or due to operator intervention, the process 300 ends.

Variations on the process 300 are possible. In an example, when the settings interface is used to adjust the settings 140 during execution of the application under test 114, the apparatus 100 may be configured to perform operation 306 to apply the updated settings 140 responsive to the user input to the settings interface. In another example, the apparatus 100 may include internal storage that may be used to save logs 142, settings 140 and applications under test 114. In yet a further example, Firmware Over The Air (FOTA) updates may be made to operating system 108, application under test 114, settings 140, logs 142 while the apparatus 100 and connected test hardware devices 138 are not actively engaged in testing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:
a vehicle data bus port configured to receive bus data from a vehicle;
a removable media port configured to receive removable media storing an application and settings;
an input/output port configured to interface with a test hardware device; and
a processor programmed to set up the test hardware device in accordance with the settings, and execute the application using the bus data and the test hardware device as configured, the settings including at least one of global positioning system (GPS) accuracy, an amount of simulated packet loss, an adjustment to network connection signal strength, whether to perform simulated intermittent connection of the test hardware device, and whether to disable one or more functions of the test hardware device.

2. The apparatus of claim 1, further comprising at least one power port configured to provide power to the test hardware device.

3. The apparatus of claim 1, wherein the test hardware device includes one of a global positioning system (GPS) module, a near-field communications (NFC) reader, a universal serial bus (USB) modem device, a dedicated short-range communications (DSRC) device, a radio-frequency identifier (RFID) reader device, and a Bluetooth communications device.

4. The apparatus of claim 1, wherein the processor is further programmed to store a log including results of the execution of the application to the removable media.

5. The apparatus of claim 1, further comprising an indicator display associated with the test hardware device, wherein the processor is further programmed to direct the indicator display to indicate when the test hardware device is connected.

6. The apparatus of claim 1, further comprising an indicator display associated with the test hardware device, wherein the processor is further programmed to direct the indicator display to indicate when the test hardware device is enabled according to the settings.

7. The apparatus of claim 1, further comprising a display configured to provide a user interface for set up of the settings.

8. A computer-implemented method comprising:
receiving, by a processor of a tester apparatus, settings and an application from a media storage device;
setting up one or more test hardware devices connected to input/output ports of the tester apparatus according to the settings; and
executing the application by the processor using the test hardware devices as set up and, based on the settings, one of: (i) live vehicle bus data and (ii) prerecorded vehicle bus data,
wherein the settings include at least one of global positioning system (GPS) accuracy, an amount of simulated packet loss, an adjustment to network connection signal strength, whether to perform simulated intermittent connection of the test hardware devices, and whether to disable one or more functions of the test hardware device.

9. The method of claim 8, further comprising executing the application using at least one of (iii) live data from peripheral devices and (iv) prerecorded data from peripheral devices.

10. The method of claim 8, further comprising powering the one or more test hardware devices using one or more power ports of the apparatus.

11. The method of claim 8, further comprising storing a log including results of the execution of the application to the media storage device.

12. The method of claim 8, further comprising retrieving the prerecorded vehicle bus data from the media storage device.

13. The method of claim 8, further comprising illuminating indicators when the one or more test hardware devices are connected to input/output ports of the apparatus.

14. The method of claim 8, further comprising illuminating indicators when the one or more test hardware devices are enabled according to the settings.

15. A system comprising:
a processor programmed to
update an indicator associated with a device category of a connected test hardware device to indicate presence of the test hardware device;

receive an application from a removable media storage device;

receive vehicle bus data from a vehicle;

set up the test hardware device in accordance with settings retrieved from the removable media storage device; and execute the application using the test hardware device and the vehicle bus data, wherein the settings include at least one of global positioning system (GPS) accuracy, an amount of simulated packet loss, an adjustment to network connection signal strength, whether to perform simulated intermittent connection of the test hardware devices, and whether to disable one or more functions of the test hardware device.

16. The system of claim 15, wherein the processor is further configured to log, to the removable media storage device, at least two of: the vehicle bus data, data from the test hardware device, and trace information from the application.

17. The system of claim 15, wherein the test hardware device includes one of a global positioning system (GPS) module, a near-field communications (NFC) reader, a universal serial bus (USB) modem device, a dedicated short-range communications (DSRC) device, a radio-frequency identifier (RFID) reader device, and a Bluetooth communications device.

18. A method comprising:

configuring test hardware devices connected to ports of a tester apparatus by a processor of the apparatus according to settings including global positioning system accuracy, simulated packet loss amount, network connection signal strength adjustment, whether to perform simulated intermittent connection of the devices, and whether to disable functions of the devices; and executing an application by the processor using the devices, based on the settings and live or prerecorded vehicle bus data.

* * * * *